United States Patent [19]

Claussen

[11] 4,008,248
[45] Feb. 15, 1977

[54] PROCESS FOR THE PURIFICATION OF COUMARINS

[75] Inventor: Uwe Claussen, Leverkusen, Germany

[73] Assignee: Bayer Aktiengesellschaft, Leverkusen, Germany

[22] Filed: Mar. 12, 1975

[21] Appl. No.: 557,658

Related U.S. Application Data

[63] Continuation of Ser. No. 451,559, March 15, 1974, abandoned.

[30] Foreign Application Priority Data

Mar. 16, 1973 Germany ............... 2313030

[52] U.S. Cl. .................... 260/308 A; 252/301.29
[51] Int. Cl.$^2$ ............ C07D 405/10; C07D 405/14
[58] Field of Search ................. 260/308 A

[56] References Cited

FOREIGN PATENTS OR APPLICATIONS 478,835  11/1969  Switzerland ............ 260/308 A Primary Examiner—Alton D. Rollins
Attorney, Agent, or Firm—Plumley and Tyner

[57] ABSTRACT

Brighteners of the formula

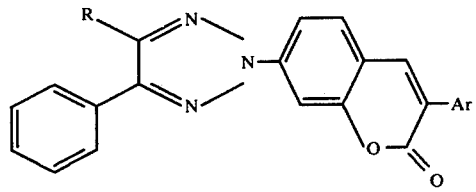

wherein R denotes hydrogen or an aliphatic or aromatic radical and Ar denotes an aromatic carbocyclic or heterocyclic radical, can be purified from colored by-products by dissolving in mineral acids and crystallized out by cooling without reduction in yield.

6 Claims, No Drawings

PROCESS FOR THE PURIFICATION OF COUMARINS

This is a continuation, of application, Ser. No. 451,559 abandoned, filed Mar. 15, 1974.

The invention relates to a process for the purification of coumarin compounds of the formula I

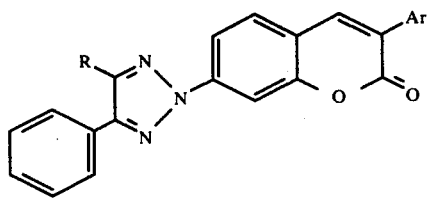

wherein
R denotes H or an aliphatic or aromatic radical and
Ar denotes an aromatic carbocyclic or heterocyclic radical.

Preferred compounds are those in which
R represents $C_1$–$C_4$-alkyl or hydrogen and
Ar represents optionally substituted phenyl, pyrazolyl,
1,2,4-triazolyl and imidazolyl.

The compounds of the formula I, their manufacture and their use as brighteners are known, for example from German Offenlegungsschriften (German Published Specifications) 1,695,817, 1,594,845 and 1,694,362. However, the processes previously described, on cyclising the intermediates to form the triazole, always give products which are contaminated by coloured by-products which impart a yellow-brownish colour to the crystals as is correctly described in German Offenlegungsschrift (German Published Specification) 1,695,817. These impurities, which substantially detract from the tinctorial effect, can only be eliminated partially by recrystallisation from organic solvents.

It has now been found that very pure preparations of the brighteners of the formula I are obtained if the compounds of the formula I are dissolved in mineral acids or mixtures of mineral acids, especially in hot sulphuric acid, and allowed to crystallise out again by cooling. Hereupon, the compounds of the formula I are recovered in a very pure form, without reduction in yield.

The optimum concentration of the sulphuric acid depends on the structure of the triazole and varies within wide limits.

On dissolving the compounds of the formula I in hot sulphuric acid, a transformation to another modification in general occurs. The new modifications (β) no longer form mixed crystals with the by-products and are therefore obtained in a pure form.

The β-modifications are characterised by a crystal habit which gives readily pourable material. The colour of the crystals of the β-modification is more greenish-tinged and the melting point lower than in the case of the α-modification.

The β-modifications can be reconverted to the original α-form by simple recrystallisation from an organic solvent, the α-form thus being obtainable in a very pure form. The β-modifications can also themselves be used as brighteners.

The highly pure preparations of the β-form and of the α-modifications which have been purified via the β-form, give brilliant and very strong brightening effects on organic materials, especially synthetic fibers.

The γ-modifications, which melt even lower, can be obtained by crystallising the β-form from dioxane.

A further subject of the invention are the β-modifications of the compound of the formula

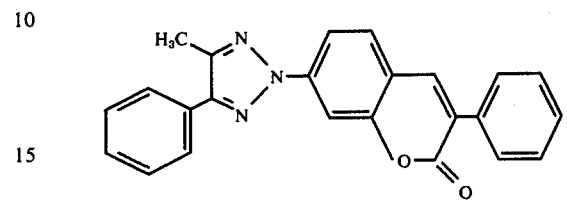

characterised by d-values of 14.98 A. 7.56 A, 4.58 A and 3.45 A in the X-ray diffraction diagram, and the β-modification of the compounds of the formula

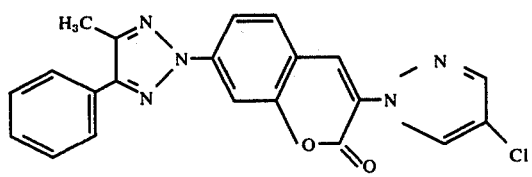

characterized by d-values of 21.55 A, 5.98 A, 3.60 A and 3.22 A in the X-ray diffraction diagram, and the process for their preparation by dissolving the known α-modification in mineral acid and cooling, and their use for brightening organic materials, especially synthetic fibre materials.

EXAMPLE 1

400 ml of 83% strength sulphuric acid ($d^{20} = 1.760$) are introduced into a beaker provided with a stirrer and warmed to 100° C. During heating, 100 g of crude 3-phenyl-7-[2-(4-phenyl-5-methyl)-1,2,3-triazolyl]-coumarin are introduced; this dissolves and the contents of the beaker assume a brown-black colouration. The mixture is kept at 100° C for 30 minutes and is then stirred until cold. At about 70° C, the β-modification begins to separate out and its separation is complete when room temperature has been reached. It is filtered off and washed first with 50 ml of cold 83% strength sulphuric acid and then with 500 ml of water. The filter cake, which still reacts acid, is now washed with 1,000 ml of water which contains 50 ml of concentrated ammonia solution until the material which issues reacts alkaline. The product is then washed with pure water until the material which issues reacts neutral. The light green product is dried; it dissolves in glycol monomethyl ether to give a clear solution, and melts at 149°–150° C. The melt immediately re-solidifies and then melts finally at 161°–162° C. Recrystallisation from toluene (1:5) gives the pure α-modification.

EXAMPLE 2

100 g of 3-phenyl-7-[2-(4-phenyl-5-methyl)-1,2,3-triazolyl]-coumarin are dissolved in 450 ml of dioxane from which 91 g of pale yellow crystals of melting point 142°–143° C crystallise on cooling. From an evaluation of the X-ray diffraction diagram by means of the Bragg equation, the following d-values are found for the three modificatons:

| d-Values [A] | | | Intensities | | |
| --- | --- | --- | --- | --- | --- |
| α | β | γ | α | β | γ |
| 14.98 | 14.98 | 14.98 | 85 | 78 | 100 |
| 13.0 | 7.46 | 7.20 | 100 | 100 | 63 |
| 6.56 | 4.58 | 3.52 | 83 | 57 | 37 |
| 3.75 | 3.45 | 3.24 | 48 | 52 | 28 |

EXAMPLE 3

32.5 g of 3-phenyl-7-[2-(4-phenyl)-1,2,3-triazolyl]-coumarin are dissolved in 200 ml of 85% strength sulphuric acid ($d^{20}$ = 1.780); on cooling, pale green crystals of the β-modification separate out and these are worked up as described in Example 1. 28 g of crystals are obtained, the X-ray diffraction diagrams of which give the following values:

| d-Value | | Intensity | |
| --- | --- | --- | --- |
| α | β | α | β |
| 17.33 | 18.4 | 48 | 43 |
| 5.91 | 6.0 | 83 | 84 |
| 3.55 | 4.67 | 100 | 37 |
| 3.30 | 3.50 | 46 | 100 |

EXAMPLE 4

20 g of 3-(4-chloropyrazolyl)-7-[2-(4-phenyl-5-methyl)-1,2,3-triazolyl[ coumarin are dissolved in 150 ml of hot sulphuric acid of density d = 1.670. On cooling, 15 g of crystals of the β-modification of melting point 225°–8° C separate out and these are worked up as described in Example 1. Evaluation of the X-ray diffraction diagram gives the following values:

| d-Value | | Intensity | |
| --- | --- | --- | --- |
| α | β | α | β |
| 6.28 | 21.55 | 67 | 49 |
| 4.98 | 5.98 | 49 | 100 |
| 3.69 | 3.60 | 73 | 62 |
| 3.38 | 3.22 | 100 | 75 |

The β-modification can be converted by recrystallisation from an organic solvent into the α-form, which melts at 239°–40° C.

I claim:

1. The compound in the β-modification and having the formula

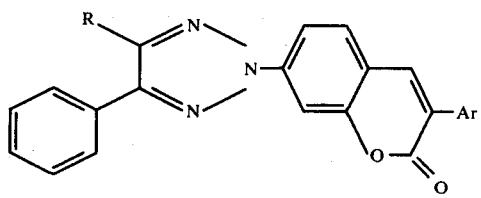

wherein
R represents hydrogen or $C_1$–$C_4$-alkyl and
Ar represents phenyl, pyrazolyl, 4-chloropyrazolyl, 1,2,4-triazolyl or imidazolyl.

2. The compound of the formula

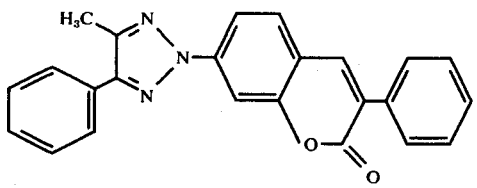

in the β-modification, characterised by d-values of 14.98 A, 7.56 A, 4.58 A and 3.45 A in the X-ray diffraction diagram.

3. Process for the preparation of the compound of claim 2 in the β-modification, characterised in that the α-modification of the compound is dissolved in hot sulphuric acid and the solution is cooled.

4. The compound of the formula

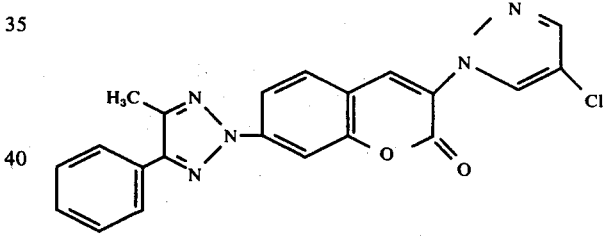

in the β-modification, characterised by d-values of 21.55 A, 5.98 A, 3.60 A and 3.22 A in the X-ray diffraction diagram.

5. Process for the preparation of the compound of claim 4 in the β-modification, characterised in that the α-modification of the compound is dissolved in hot sulphuric acid and the solution is cooled.

6. In a process for the purification of compounds of the formula

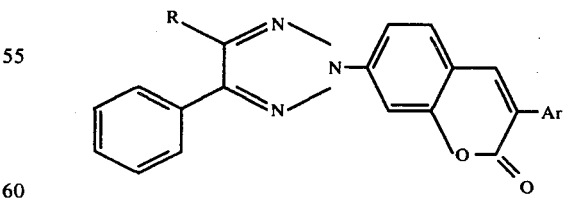

wherein
R is hydrogen or $C_1$–$C_4$-alkyl, and
Ar is phenyl, pyrazolyl, 4-chloropyrazolyl, 1,2,4-triazolyl, or imidazolyl,
the improvement which comprises dissolving said compounds in sulphuric acid and thereafter cooling the solution and recovering crystals of said compounds.

* * * * *